United States Patent [19]
Abbott et al.

[11] 3,812,937
[45] May 28, 1974

[54] DAMPING MEDIA FOR ENERGY ABSORBING DEVICES

[75] Inventors: William J. Abbott; Malcolm Rankin, both of Bradford, Pa.

[73] Assignee: Witco Chemical Corporation, New York, N.Y.

[22] Filed: Oct. 4, 1972

[21] Appl. No.: 295,026

[52] U.S. Cl. .................. 188/266, 252/28, 252/72
[51] Int. Cl. ........................ F16f 9/30, C09k 3/00
[58] Field of Search .............. 252/73, 72, 77, 28; 293/89, 70; 267/116; 188/266

[56] References Cited
UNITED STATES PATENTS
3,755,166   8/1973   Abbott et al..................... 252/28 X Primary Examiner—Leon D. Rosdol
Assistant Examiner—Harris A. Pitlick
Attorney, Agent, or Firm—Albert L. Gazzola; Jordan J. Driks; Morton Friedman

[57] ABSTRACT

In a hydraulic liquid energy absorbing device for use in low impact bumpers for vehicles, a hydraulic gelled liquid (damping media) comprising a low viscosity petroleum oil, having dispersed therein up to about 20 percent of a modified organophylic montmorillonite (Bentone), and sufficient dispersant such as methanol; said damping media having an unworked penetration of about 225–300 at 77°F. It can contain a small amount of a dispersed polymer such as polybutene, polyisobutene, polybutadiene, polyisoprene, polystyrene, and rubber latex, and the like.

8 Claims, No Drawings

DAMPING MEDIA FOR ENERGY ABSORBING DEVICES

The present invention is concerned with the use of a modified organophylic montmorillonite, hereinafter referred to as a "Bentone," dispersed in a lubricating oil for use as a hydraulic or damping media in energy absorbing devices associated with vehicle bumpers, such as automobile bumpers. This damping media is thermally stable, i.e., it does not separate or become overly viscous at lower temperatures or overly fluid at higher temperatures and operates effectively as a damping fluid over a temperature range of about −40°F. to 180°F., and even higher. It retains its consistency even under severe thermal changes, and has a minimum tendency to leak out, over this wide temperature range, under the pressures encountered in such bumper absorbing devices during an impact while a vehicle is travelling at speeds of up to about 10 m.p.h.

The development of bumpers, for use in vehicles, which can withstand low speed impact has become particularly significant in recent years because of the severe damage to automobiles, after bumper impact, even at low speeds of two or three miles per hour. The bumpers, when equipped with energy absorbing devices containing one of the many available hydraulic fluids, even when fortified with an anti-leak additive, are prone to leakage of the hydraulic fluid. It is to be noted that energy absorbing devices associated with bumpers are positioned in a horizontal plane, whereas "shock absorber" energy absorbing devices used in automobiles for ride stability, are positioned vertically. Because of the horizontal position, bumper energy absorbing devices are more prone to leakage and this leakage occurs as stated above, when employing the known hydraulic fluids in these devices.

The damping media, to be effective and practical for use in horizontal positioned bumpers, must not only have minimal tendency to leak out, but must also effectively inhibit water, grime and dirt penetration, to be most effective. As stated hereinbefore, it must be thermally stable over a wide temperature range, i.e. about −40° to 180°F., and even higher, have a suitable consistency over this temperature range, and must dependably function as a damping media even after repeated impacts at up to 10 m.p.h. In addition, it must lend itself to filling into the energy absorbing device by conventional methods, i.e., without clogging or jamming of the filling apparatus, particularly at the orifice and without leaving pockets of air in the filled device. The present invention makes possible a damping media which meets the above requirements for horizontally positioned energy absorbing devices used on vehicular bumpers.

It is a particular advantage of the present damping media that it does not require expensive viscosity improvers as used in the "shock absorber" art. It is another advantage that the ingredients of this damping media are readily available and may be purchased on the open market and they are relatively low in cost. The present application makes no claim to the composition per se. Very similar compositions are well known for use in lubricating greases and are disclosed in the following patents, among others: U.S. Pat. No. 2,531,440, issued to Jordan on Nov. 28, 1950; U.S. Pat. No. 2,879,229, issued to Stratton on Mar. 24, 1959; U.S. Pat. No. 3,007,867 issued to Allen et al. on Nov. 7, 1961; and U.S. Pat. No. 3,537,994, issued to House on Nov. 3, 1970, which are incorporated herein by reference. The present damping media composition requires only small modifications, as shown in the appended examples, of the known lubricating grease compositions, to assure suitable consistency for horizontally positioned energy absorbing devices and minimize leakage. There appears no teaching, to the knowledge of applicants, of the present surprising advantageous employment of a modified grease composition as a damping media, particularly in that greases require controlled gradual leakage to lubricate; contrastingly the present damping media is leak resistant. Even more unexpected, is the singular efficacy as a damping media of the present specific modified grease composition to the exclusion of other known grease compositions, for use with horizontally positioned energy absorbing devices intended for use with bumpers on vehicles, as presently disclosed.

Broadly speaking, the present invention relates to a damping media having an unworked penetration of about 225–300 at 77°F., and preferably about 240–260 at 77°F., comprising a petroleum oil bodied with a Bentone, for use in energy absorbing devices, and more particularly for use in horizontally positioned energy absorbing devices intended for vehicle bumpers, comprising about 2 to 20 percent by weight of a Bentone dispersed in a petroleum oil base, preferably a naphthenic based oil, containing a dispersant such as methanol, acetone, propylene carbonate, acetonitrile, and mixtures as known in the art. Methanol is inexpensive, readily available and effective, and is preferred.

The damping media can also have dispersed therein one or more of a polymer additive such as a polybutene, polyisobutene, polybutadiene, polyisoprene, polystyrene, natural rubber and the like, and mixtures, and can be added as a latex, as known in the art, for convenience. The inclusion of a small amount of polymer i.e., about 0.5–1.0 percent by weight, such as described in the appended examples, being a preferred embodiment. It is to be understood, however, that the basic composition, comprising a petroleum oil, a dispersant and a Bentone, as stated hereinbefore, without further additive is effective as a damping media for horizontally positioned energy absorbing devices, and that addition of a polymer additive, as known in the art, to insure maximum retardation of leakage, represents a preferred embodiment of the present invention.

Other additives i.e., anti-corrosion compounds such as sodium nitrite, calcium petroleum sulfonate, zinc chromate, and the like, dispersed in small amounts, for instance, 0.1–0.5 weight percent as known in the art, may be incorporated in the present damping media composition, as determined by the needs of the artisan.

The petroleum oils employed in the present damping media are those having a viscosity at 100°F. of between about 60 and 100 SUS. With petroleum oils of higher viscosities, i.e., above 100 SUS at 100°F., there is a tendency of overstiffness of the damping media especially at −40°F. With oils having a viscosity of less than about 60 SUS at 100°F., leakage progressively becomes more manifest. A petroleum oil having a viscosity of between 70–80 SUS at 100°F. results in a well balanced damping media and is preferred.

Naphthenic based oils impart to the damping media a more desirable stiffness and less tendency to leak under pressure and are preferred. Paraffinic lubricating oils are more prone to leakage, but they are also effective in the present damping media composition in all other respects, and may be combined with a polymer, supra, for maximum reduction of leakage.

The Bentone (organophylic montmorillonites) of the present composition are well known. They are generally prepared by reacting a montmorillonite clay with an aliphatic amine salt in which the aliphatic portion of the amine is a carbon chain of from 10 to 18 carbons. They are described in an article by J. W. Jordan in the Journal of Physical and Colloid Chemistry, Vol. 53, No. 2, 1949, Pages 294–306. For purposes of this invention, the aliphatic amine salt is a long chain quaternary ammonium salt having more than about 12 carbon atoms to insure organophylic properties. Quaternary ammonium salts having two long chains, i.e. 16–18 carbon atoms each, yield a completely organophylic Bentone, and are preferred. They may be prepared by reacting a hydrated montmorillonite with a secondary fatty amine such as distearyl amine, as known in the art. The Bentone is dispersed in the petroleum oil preferably in a concentration of about 8–12 percent by weight, using a small amount of a dispersant, as known in the art for making greases, to produce the present damping media.

The present damping media is prepared substantially as are the known greases, as described in the above patents incorporated herein by reference, and as disclosed in the appended examples. Generally, the present damping media are prepared by mixing such small amounts of polymers as required with the petroleum oil, then adding the Bentone with good mixing, and finally mixing in the dispersant. Anticorrosive agents may be mixed with either the petroleum oil or the Bentone initially. Temperatures from 50 to 150°F. are satisfactory for mixing the ingredients. Satisfactory mixing procedes more rapidly at the higher temperatures in this range. After the ingredients are all stirred together until uniform, the whole mixture is processed through a mill or a pressure homogenizer to activate the gelling agent and arrive at the final required consistency. The blended mixture is then filled into the hydraulic fluid cavity of an energy absorbing device, using available filling apparatus, as known in the art, and does not agglomerate or clog the filling orifice during the filling operation. The damping media retains its consistency in the energy absorbing device and may be stored for prolonged periods until ready for use.

The following examples illustrate specific embodiments of the present invention and are not to be construed as limiting thereto.

EXAMPLE 1

Into 90 parts by weight of a naphthenic 75 SUS/100°F. petroleum oil is mixed 0.5 parts by weight of a rubber latex sold as Heavetex LMG, Heavetex Corporation, Everett, Mass., containing about 56 percent by weight of natural rubber dispersed in water, in a grease mixing kettle at 100°F., with 10 parts by weight of Nykon 77, sold by N. L. Industries, New York, N.Y., an organophylic montmorillonite containing a small amount of sodium nitrite anticorrosive agent. Then 1.0 part by weight of methanol (5 percent water) is mixed in thoroughly. The mixture is then passed through a colloid mill to a consistency of 251 (unworked penetration) at 77°F., 135 at −40°F. and 274 at 180°F.

The product, when filled into a prototype horizontal positioned energy absorbing device, demonstrates no leakage over the temperature range of −40 to 180°F. The device performs satisfactorily as an energy absorber between −40 and 180°F. under impacts simulating bumper impacts of up to 10 mph. of a full sized automobile.

The damping media retains its consistency even after storage for 6 months in the prototype energy absorbing device, and retains its effectiveness as a damping media.

EXAMPLE 2

Into 88 parts by weight of a 100 SUS/100°F. paraffinic petroleum oil having a 0°F. pour point, is mixed 0.5 parts by weight of a rubber latex as in Example 1 and 12 parts by weight of Nykon 77, as in Example 1, in a grease mixing kettle at 120°F. Then 1.0 part by weight of methanol (5 percent water) is mixed in thoroughly. The mixture is then passed through a colloid mill to a consistency of 245 (unworked penetration) at 77°F., 62 at −40°F. and 254 at 180°F.

The product, when filled into a prototype horizontal positioned energy absorbing device, demonstrates no leakage over the temperature range of −40 to 180°F. The device performs satisfactory as an energy absorber between −40 and 180°F. under impacts simulating bumper impacts of up to 10 m.p.h. of a full sized automobile.

The damping media retains its consistency even after storage for 6 months in the prototype energy absorbing device, and retains its effectiveness as a damping media.

We claim:

1. A horizontally positioned energy absorbing device adapted for vehicle bumpers having a damping media contained therein, said damping media being thermally stable and resistant to leakage under positive pressure, consisting essentially of a petroleum oil having a viscosity at 100°F. in the range of about 60–100 S.U.S., having dispersed therein about 2–20 percent of a modified organophylic montmorillonite, prepared by reacting a montmorillonite clay with a $C_{10}$–$C_{18}$ aliphatic amine salt, and a dispersing amount of a dispersant, for dispersing said organophylic montmorillonite, said damping media having an unworked penetration in the range of about 225–300 at 77°F.

2. An energy absorbing device as in claim 1, wherein said damping media having an unworked penetration in the range of about 240–270 at 77°F., is filled therein.

3. An energy absorbing device as in claim 1 wherein said organophylic montmorillonite is present in said damping media in the range of about 8–12 percent by weight.

4. An energy absorbing device as in claim 1 wherein the petroleum oil in said damping media has a viscosity in the range of about 70–80 SUS at 100°F.

5. An energy absorbing device as in claim 1 wherein the petroleum oil is substantially a naphthenic based oil.

6. An energy absorbing device as in claim 1 wherein the dispersant is methanol.

7. An energy absorbing device as in claim 1 wherein said damping media contains about 0.5–1.0 percent by weight, of a polymer selected from the group consisting of polybutene, polyisobutene, polybutadiene, polyisoprene, polystyrene, natural rubber and mixtures thereof, dispersed therein.

8. An energy absorbing device as in claim 7 wherein said polymer is a latex.

* * * * *